US008825111B2

(12) United States Patent
Fourquin et al.

(10) Patent No.: US 8,825,111 B2
(45) Date of Patent: Sep. 2, 2014

(54) PORTABLE COMMUNICATION EQUIPMENT FOR MOBILE TELEPHONY AND TELEVISION, AND CORRESPONDING ACCESSORY

(75) Inventors: Xavier Fourquin, Sevres (FR); Philippe Boutier, Les Ulis (FR); Minh Le, Neuilly sur Seine (FR); Carole Fagnoni, Neuilly sur Seine (FR)

(73) Assignee: DRNC Holdings, Inc., Wilmington, DE (US)

( * ) Notice: Subject to any disclaimer, the term of this patent is extended or adjusted under 35 U.S.C. 154(b) by 983 days.

(21) Appl. No.: 11/645,007

(22) Filed: Dec. 26, 2006

(65) Prior Publication Data

US 2007/0207813 A1    Sep. 6, 2007

(30) Foreign Application Priority Data

Dec. 27, 2005   (EP) ..................................... 05112993

(51) Int. Cl.
| | | |
|---|---|---|
| *H04M 1/00* | (2006.01) | |
| *H04M 1/05* | (2006.01) | |
| *H04M 1/02* | (2006.01) | |
| *H04W 4/02* | (2009.01) | |
| *H01Q 5/00* | (2006.01) | |
| *A63F 7/26* | (2006.01) | |
| *B60R 11/04* | (2006.01) | |
| *B60R 1/12* | (2006.01) | |
| *G06K 7/10* | (2006.01) | |
| *H04B 1/38* | (2006.01) | |

(52) U.S. Cl.
CPC ................ *H04M 1/05* (2013.01); *H04M 1/026* (2013.01); *H04W 4/02* (2013.01); *H01Q 5/0031* (2013.01); *H10Q 9/0457* (2013.01); *A63F 2300/572* (2013.01); *A63F 7/26* (2013.01); *B60R 11/04* (2013.01); *B60R 2001/1276* (2013.01); *G06K 7/10396* (2013.01); *H04B 1/3833* (2013.01); *H04B 1/33838* (2013.01)
USPC ..................... 455/556.1; 455/566; 455/566.1; 455/575.8; 455/95; 455/41.1; 455/575.1; 455/575.6; 348/729; 343/718; 343/860

(58) Field of Classification Search
CPC ...... H04M 1/05; H04M 1/026; H01Q 5/0031; H01Q 9/0457; H63F 2300/1012; H63F 2300/572; H04B 1/345; H04W 4/02; H04W 88/02; H04W 64/00; H04W 40/246; B60R 11/04; B60R 1/04; B60R 1/10; B60R 1/12; B60R 1/1207; B60R 2001/1215; B60R 2001/23; B60R 2001/1276; B60R 2001/1284; B60R 25/24; B60R 25/406
USPC ............ 455/556.1, 566, 575.8, 95, 101, 41.1, 455/575.1, 575.6; 348/729; 343/718, 860
See application file for complete search history.

(56) References Cited

U.S. PATENT DOCUMENTS 2,535,053 A * 12/1950 Ercolino ........................ 343/718
6,047,163 A *  4/2000 Miyoshi .......................... 455/39

(Continued)

FOREIGN PATENT DOCUMENTS

| GB | 2358990 | 8/2001 |
|---|---|---|
| WO | WO99/60712 | 11/1999 |
| WO | WO2004/112268 | 12/2004 |

*Primary Examiner* — Nimesh Patel
(74) *Attorney, Agent, or Firm* — Eric Berkowitz

(57) ABSTRACT

The invention relates to a portable communication equipment comprising a handset with means for transmitting and receiving radiofrequency mobile telephony signals via a cellular radiocommunication network; means for receiving radiofrequency television signals; means for displaying data corresponding to received television signals and acoustic means for reproducing sounds associated to received television signal. According to the invention, said means for receiving radiofrequency television signals comprise a tuner and demodulator located in an accessory separated from said handset and intended to be worn by a user of the handset, said accessory comprising an external metallic area intended to be in direct contact with the skin of said user and electrically linked to an input of said demodulator, and in that said equipment also comprises a transmitting link for transmitting to said handset data corresponding to received radiofrequency television signals downstream from said demodulator.

13 Claims, 1 Drawing Sheet

(56) References Cited

U.S. PATENT DOCUMENTS

| | | | |
|---|---|---|---|
| 6,597,320 B2 * | 7/2003 | Maeda et al. | 343/718 |
| 6,859,657 B1 * | 2/2005 | Barnard | 455/575.6 |
| 2002/0005808 A1 * | 1/2002 | Ito et al. | 343/700 MS |
| 2002/0021800 A1 * | 2/2002 | Bodley et al. | 379/430 |
| 2002/0068600 A1 * | 6/2002 | Chihara et al. | 455/550 |
| 2002/0094829 A1 * | 7/2002 | Ritter | 455/517 |
| 2002/0190689 A1 * | 12/2002 | Nakamura et al. | 320/102 |
| 2003/0072257 A1 | 4/2003 | Ikedo et al. | 370/208 |
| 2005/0186931 A1 | 8/2005 | Laiho et al. | 455/280 |
| 2008/0024375 A1 * | 1/2008 | Martin et al. | 343/718 |
| 2010/0019982 A1 * | 1/2010 | Washiro | 343/860 |

* cited by examiner

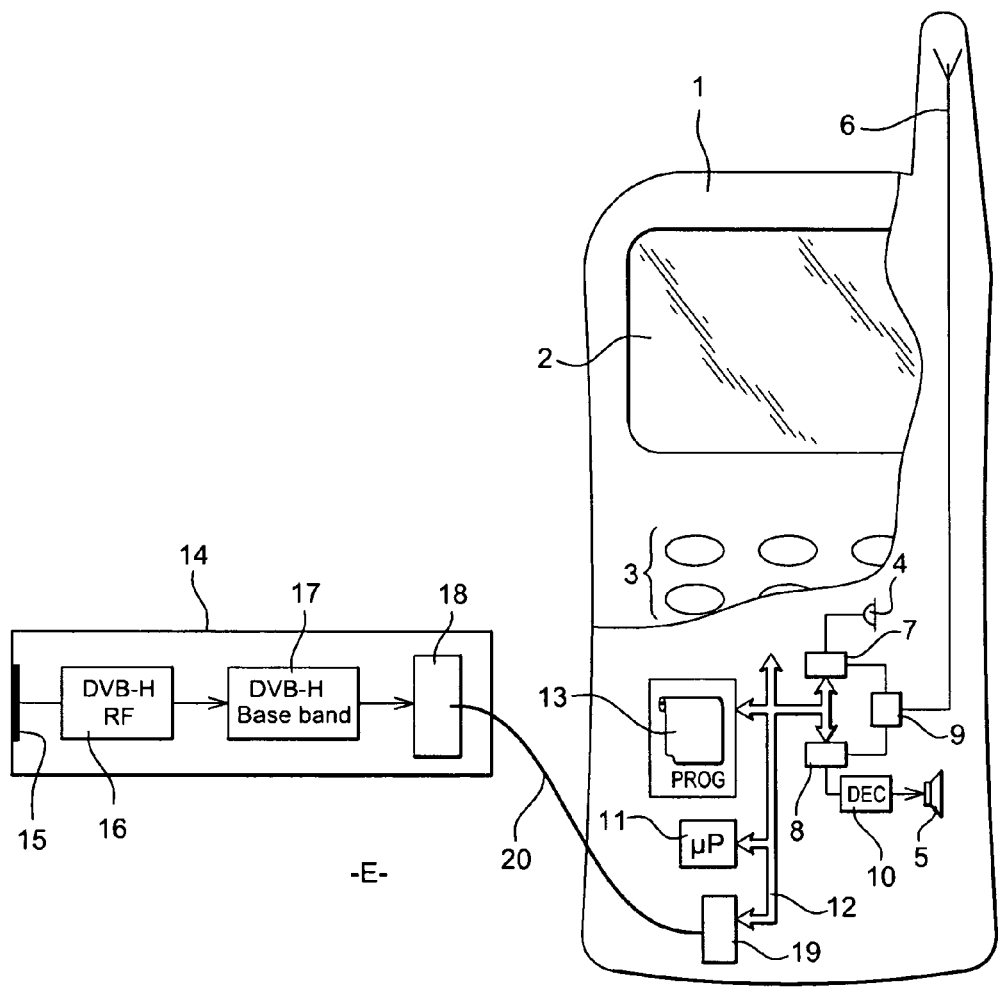

PORTABLE COMMUNICATION EQUIPMENT FOR MOBILE TELEPHONY AND TELEVISION, AND CORRESPONDING ACCESSORY

FIELD OF INVENTION

The present invention claims the benefit of European Patent Application No. 05112993.0 filed in Europe on Dec. 27, 2005, which is hereby incorporated by reference.

BACKGROUND

The present invention relates to portable communication equipment which enables both transmission/reception of radiofrequency mobile telephony signals via a cellular network, and reception of radiofrequency television signals.

Mobile phones, which enable transmission and reception of radiofrequency telephony signals (namely voice but also messages, e-mails and multimedia content signals) via a cellular radiocommunication networks, are used now by a great percentage of the population. It is desirable to provide such mobile phones with additional functionalities. The reception of radiofrequency television signals are part of these new functionalities.

Today, two standards already exist in order to broadcast digital television signals on portable equipments, namely DVB-T, and DVB-H which is an adaptation of DVB-T for mobile equipments.

At the time being, only prototypes have been manufactured, which integrate, in the housing of a mobile handset, radiofrequency and signal processing modules enabling reception of television signals according to DVB-H standard. Once signals have been received and processed in order to extract digital television data, the visual part of television data is displayed on a display of the handset, while the sound part of television data is provided to a loudspeaker of the handset.

Main drawbacks of such integrated functionalities in a single handset are the following:

First, a dedicated antenna is needed for receiving radiofrequency television signals. However, in case of DVB-T, antenna of large size is required, which is incompatible with the generally desired compactness of the handset. For DVB-H standard, antenna can be of lower size. However, DVB-H standard will not be available in all countries at the same time, and should even be available much later than DVB-T standard in most cases. In addition, reception with DVB-H will probably be a paying service for the users, while DVB-T might be free.

A second important drawback is that transmission of radiofrequency telephony signals might interfere with reception of radiofrequency television signals. Since reception of television signals is concentrated on a small period of time (namely, 10% of the time is used for receiving television signals, while 90% of time is used for displaying received television signals), one cannot afford to take the risk to disturb the reception time with the transmission by the handset of a telephony signal.

One solution could be to forbid such transmission of the handset when the user is in a television display mode. However, this would lead to deprive the user of the basic functionality of his mobile phone, which is hardly conceivable. Additionally, most of the providers for television programs will be interested by the concept of interactive television. With this concept, the user of the television service would be asked to react in real time, for instance by sending a SMS or making a call. This means that a cellular return channel for transmitting telephony signals during periods of time in coincidence with television reception period would be compulsory. In this case, the transmission of telephony signals could interfere with the reception of television signals.

SUMMARY

The aim of the invention is to remedy the above drawbacks. To this aim, first object of the present invention is a portable communication equipment comprising:

A handset including transmitting/receiving means for transmitting and receiving radiofrequency mobile telephony signals via a cellular radiocommunication network; receiving means for receiving radiofrequency television signals; displaying means for displaying data corresponding to received television signals and acoustic means for reproducing sounds associated to received television signal; characterized in that said receiving means for receiving radiofrequency television signals comprise a tuner and demodulator for extracting digital television data from received radiofrequency television signals, located in an accessory separated from said handset and intended to be worn by a user of the handset, said accessory comprising an external metallic area intended to be in direct contact with the skin of said user and electrically linked to an input of said tuner and demodulator, and in that said equipment also comprises a transmitting link for transmitting to said handset digital television data downstream from said demodulator.

Thanks to these features, the user's body acts as an antenna for receiving television signals and there is no need to provide the accessory with a dedicated antenna, and the radiofrequency part of the television receiving means, namely the tuner and demodulator, are not disturbed by transmission of radiofrequency signals which could be transmitted at the same time by the handset.

In one possible embodiment, said accessory is a headset which is associated to said handset. In this case, external metallic are can be advantageously located on a part of the headset which is normally used to hold said headset on the user's ear.

Transmitting link between said accessory and said handset may be either made via a wired link, or by a wireless link, e.g. of the Bluetooth type.

Displaying means can be located either on the handset, or to a second separated accessory to which said handset sends television signals to be displayed.

A second object of the invention relates to a portable accessory for receiving radiofrequency television signals characterized in that it comprises: an external metallic area intended to be in direct contact with the skin of a user; a tuner and demodulator, the input of which is electrically linked to said external metallic area, for extracting digital television data from received radiofrequency television signals; and transmission means for transmitting digital television data downstream from said demodulator via a transmitting link to a handset including transmitting/receiving means for transmitting and receiving radiofrequency mobile telephony signals via a cellular radiocommunication network, so that data corresponding to radiofrequency television signals received by said accessory can be displayed on displaying means controlled by said handset.

BRIEF DESCRIPTION OF THE DRAWINGS

Other features and advantages of the invention will become apparent from the following description of the invention given by way of a non-limiting example only and with reference to the unique FIGURE showing schematically possible equipment according to the invention.

DETAILED DESCRIPTION

In relation with FIG. 1, an equipment E according to the present invention includes first a mobile handset 1 which can be used to implement the method of the invention. In the manner that is well-known in the art, handset 1 essentially includes, in a housing, displaying means 2 and a keypad 3 which constitute part of man-machine interfaces for a user of the handset. Mobile handset 1 also comprises a microphone 4 and a loudspeaker 5, and transmitting and receiving means for transmitting and receiving radiofrequency mobile telephony signal via a cellular radio communication network. More precisely, said transmitting and receiving means comprise an antenna 6, and a transmitting circuit 7 and receiving circuit 8 connected to antenna 6 through for instance a duplexer 9. Transmit circuit 7 receives the signals to be transmitted from microphone 4. Receiving circuit 8 is connected to a receive decoder 10 connected to loudspeaker 5. From the functional point of view, mobile handset 1 comprises an electronic circuit including a microprocessor 11 connected by a data, address and control bus 12 to displaying means 2, keypad 3, transmitting circuit 7 and receiving circuit 8. Electronic circuit also includes an internal memory 13 for storing data and programs to be executed. The above description is merely one example of the functional architecture of a mobile telephone. Of course, handset 1 also includes other components which are not shown here because they are not necessary for understanding the invention.

In addition, according to an essential aspect of the invention, equipment E includes an accessory 14 which is separated from handset 1, and intended to be worn by a user of the handset. Accessory 14 comprises an external metallic area 15, the purpose of which is to be in direct contact with the skin of the user. Metallic area 15 is electrically connected to receiving means for receiving radiofrequency television signals, and more precisely to the input of the RF part of receiving means, mainly a tuner and demodulator 16 which demodulates received signals in order to deliver digital television data. Television data are then provided to a base-band module 17 which processes the data. Processed television data are then sent via a transmission means or connecting interface 18 to a corresponding connecting interface 19 on handset 1 via a transmitting link 20. As shown on the FIGURE, transmitting link is a wired link. Alternatively, a wireless link, for instance of the Bluetooth's type, can be used. Once received by the handset, the streams of television data are then demultiplexed and decoded at the level of the handset, in order to extract useful data (i.e. visual data and sound data). The exact processing of the data is not detailed here since it is not necessary to understand the present invention. Extracted data can then be displayed on displaying means 2 and heard via loudspeaker 5.

Other embodiments could be done without departing from the invention:

For instance, handset could transmit said data to a second separated accessory for display on displaying means located on this second accessory.

Additionally, base band module 17 can be included at the level of handset 1, instead of being located inside accessory 14. The important feature is that at least tuner and demodulator 16 is located in accessory 14 so as not to be disrupted by transmission of radiofrequency mobile telephony signals which could occur in coincidence with a time period for receiving radiofrequency television signals.

Thanks to the invention, user's body, when in contact with metallic area 15 of accessory 14, acts as an antenna for receiving television signal. There is thus no need to provide accessory 14 with a dedicated antenna which could be of large size. Accordingly, standards such as DVB-H or DVB-T may be used. Additionally, there is no risk of interference during reception of television signal due to coincident transmission by handset.

Accessory 14 can be a specific accessory dedicated to television reception. However, said accessory may advantageously be an existing accessory associated to handset 1, such as a headset. Some headsets are known with an articulated part whose shape fits the back of ear in order to hold the headset on the user's ear. In this case, external metallic area can be located on this articulated part. Alternatively, it can be located on the housing of the headset facing the external side of ear. Other possibilities are to provide such accessory in belt or swatch or any jewel which can be worn in direct contact with the skin.

What is claimed is:

1. A portable communication system, comprising:
  a handset comprising a transmitting and receiving unit configured to transmit and receive radiofrequency (RF) telephony signals; and
  an accessory that is separated from the handset and that is configured to be worn by a user, wherein the accessory comprises:
    a tuning and demodulating unit; and
    a conductive contact exposed from an outer-most surface of the accessory and electrically linked to an input of the tuning and demodulating unit, wherein the conductive contact is capable of directly contacting the skin of the user so that RF television signals received by the user's body are passed to the tuning and demodulating unit via the conductive contact for demodulation and subsequent transmission of television data to the handset, and wherein:
  the accessory is free of any antennas that are dedicated to receiving RF television signals, and
  the transmitting and receiving unit is configured to transmit the RF telephony signals during a time period which coincides with a time period during which the tuning and demodulating unit receives RF television signals.

2. The portable communication system of claim 1, wherein the accessory comprises one selected from the group consisting of a headset, a belt and a piece of jewelry.

3. The portable communication system according to claim 2, wherein the accessory comprises the headset, and wherein the conductive contact is located on a part of the headset used to hold the headset on an ear of the user.

4. The portable communication system according to claim 1, wherein the RF television signals have a format chosen among DVB-H and DVB-T.

5. The portable communication system of claim 1, wherein the handset further comprises a display unit configured to display a visual component of television data extracted from the received RF television signals and an acoustic unit configured to play an audio component of the television data extracted from the received RF television signals.

6. The portable communication system of claim 1, further comprising a display unit that is separate from the handset and the accessory, the display unit being configured to display a visual component of television data extracted from the received RF television signals.

7. The portable communication system of claim 1, wherein the accessory is configured to communicate television data extracted from the received RF television signals to the handset over a transmitting link.

8. The portable communication system of claim 7, wherein the transmitting link is wired and/or wireless.

9. The portable communication system of claim 7, wherein the accessory comprises a first connecting interface and the handset comprises a second connecting interface, and wherein the transmitting link interconnects the first and second connecting interfaces to allow for transmission of television data between the accessory and the handset.

10. The portable communication system of claim 9, wherein the accessory further comprises a base-band module electrically interconnected between the tuning and demodulating unit and the first connecting interface for processing television data received from the tuning and demodulating unit and sending the processed television data to the first connecting interface.

11. The portable communication system of claim 1, wherein the accessory includes a housing configured to be worn on a head of the user.

12. The portable communication system of claim 1, wherein the conductive contact is located on a part of the accessory used to hold the accessory on an ear of the user.

13. The portable communication system of claim 1, further comprising:
    a baseband unit electrically connected to the tuning and demodulating unit for processing television data received from the tuning and demodulating unit.

\* \* \* \* \*